(12) United States Patent
Sun et al.

(10) Patent No.: US 12,056,197 B2
(45) Date of Patent: *Aug. 6, 2024

(54) IDENTIFYING INFORMATION USING REFERENCED TEXT

(71) Applicant: Google LLC, Mountain View, CA (US)

(72) Inventors: Chen Sun, Great Neck, NY (US); Yifan Xu, Elmhurst, NY (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/150,739

(22) Filed: Jan. 5, 2023

(65) Prior Publication Data
US 2023/0229714 A1    Jul. 20, 2023

Related U.S. Application Data

(63) Continuation of application No. 17/065,256, filed on Oct. 7, 2020, now Pat. No. 11,580,177, which is a continuation of application No. 15/950,335, filed on Apr. 11, 2018, now Pat. No. 10,878,176, which is a continuation of application No. 14/168,649, filed on Jan. 30, 2014, now Pat. No. 9,971,746.

(51) Int. Cl.
G06F 16/951    (2019.01)
G06F 40/143    (2020.01)
G06F 40/186    (2020.01)

(52) U.S. Cl.
CPC .......... G06F 16/951 (2019.01); G06F 40/143 (2020.01); G06F 40/186 (2020.01)

(58) Field of Classification Search
None
See application file for complete search history.

(56) References Cited

U.S. PATENT DOCUMENTS

| 7,085,994 | B2 | 8/2006 | Gvily |
| 7,555,480 | B2 | 6/2009 | Zhang et al. |
| 8,285,716 | B1 | 10/2012 | Srinivasaiah |
| 8,380,693 | B1 | 2/2013 | Xu et al. |
| 9,098,582 | B1 | 8/2015 | Bass et al. |
| 2005/0066269 | A1* | 3/2005 | Wang ................ G06F 40/143 |
| | | | 707/E17.109 |

(Continued)

Primary Examiner — Dawaune A Conyers
(74) Attorney, Agent, or Firm — Brake Hughes Bellermann LLP

(57) ABSTRACT

Methods, systems, and apparatus, including computer programs encoded on a computer storage medium, for determining summary content for resources in a domain. In one aspect, a method includes accessing a first resource belonging to a particular domain, selecting an anchor in the first resource linking to a second resource belonging to the particular domain, identifying particular text content in the first resource that is subordinate to the anchor that the second resource includes the particular text content that is subordinate to the anchor, based on determining that the second resource includes the particular text content that is subordinate to the anchor, generating a domain template for the particular domain, the domain template specifying a location of the particular text content in the second resource, and determining, for each respective resource belonging to the particular domain having a structure matching the domain template, respective text content for the respective resource.

19 Claims, 9 Drawing Sheets

(56) References Cited

U.S. PATENT DOCUMENTS

| | | | |
|---|---|---|---|
| 2006/0026496 A1* | 2/2006 | Joshi | G06F 16/953 |
| | | | 707/E17.118 |
| 2007/0239710 A1 | 10/2007 | Jing et al. | |
| 2007/0240031 A1 | 10/2007 | Zhao et al. | |
| 2008/0134015 A1 | 6/2008 | Milic-Frayling et al. | |
| 2009/0259649 A1 | 10/2009 | Poola | |
| 2009/0287698 A1 | 11/2009 | Marmaros et al. | |
| 2010/0228744 A1 | 9/2010 | Craswell et al. | |
| 2011/0238644 A1 | 9/2011 | Dou et al. | |
| 2012/0215755 A1 | 8/2012 | Kumar et al. | |
| 2013/0054371 A1 | 2/2013 | Mason et al. | |
| 2013/0254189 A1 | 9/2013 | Kumar et al. | |
| 2013/0275422 A1 | 10/2013 | Silber et al. | |

\* cited by examiner

FIG. 2A

Why is the sky dark at night? — 201 http://www.example1.com/example_page1 — 204

Web | Images | Videos | Maps | News | Shopping | Gmail | more ▼ user@gmail.com | Web History | Settings ▼ | Sign out  Google

Why is the sky dark at night? — 210

Answer: — 211
The sky is dark at night because this portion of the Earth is facing away from the sun.

Ad — 206

Related Q&A: — 212
What is the color of the sky? — 213
 The color of the sky depends on the wavelengths . . . — 214
Which day of the year has the longest night? — 215
 On the lunar calendar, it is shown as . . . — 216
Why is the sky blue? — 217
 The color of the sky is blue because the blue light is . . . — 218
. . .

IDENTIFYING INFORMATION USING REFERENCED TEXT

CROSS-REFERENCE TO RELATED APPLICATION

This application is a continuation of U.S. application Ser. No. 17/065,256, filed Oct. 7, 2020, which is a continuation of U.S. application Ser. No. 15/950,335, now U.S. Pat. No. 10,878,176, filed Apr. 11, 2018, which is a continuation of U.S. application Ser. No. 14/168,649, now U.S. Pat. No. 9,971,746, filed Jan. 30, 2014, the contents of each are incorporated by reference herein.

BACKGROUND

This specification relates to generating summaries of resources.

The Internet provides access to a wide variety of resources, such as video and/or audio files, and web pages for particular subjects. A search system provides search results in response to users' search queries. Often, to help users to select a search result, the results page displays a summary, or a snippet, for each of the search results. To determine what text content to be included in the summary, the search engine automatically crawls the web and tries to identify useful text content in a webpage. However, it sometimes may be difficult to automatically identify and extract the useful text content in some webpages because the section that includes the useful text content is often mixed with sections that provide other text content that does not directly related to the subject matter of the webpage, such as advertisements, weather, etc.

SUMMARY

In general, one innovative aspect of the subject matter described in this specification can be embodied in methods that include the actions of accessing a first resource belonging to a particular domain; selecting an anchor in the first resource linking to a second resource belonging to the particular domain; identifying particular text content in the first resource that is subordinate to the anchor; determining, by one or more computers, that the second resource includes the particular text content that is subordinate to the anchor; based on determining that the second resource includes the particular text content that is subordinate to the anchor, generating a domain template for the particular domain, the domain template specifying a location of the particular text content in the second resource; and determining, for each respective resource belonging to the particular domain having a structure matching the domain template, respective text content for the respective resource. Other embodiments of this aspect include corresponding systems, apparatus, and computer programs, configured to perform the actions of the methods, encoded on computer storage devices.

Another aspect of the subject matter described in this specification can be embodied in methods that include the actions of identifying a source code pattern that includes a repeat of HTML elements in source code of the first resource, where each HTML element of the repeat of HTML elements includes a respective anchor that links to a respective resource belonging to the particular domain; selecting the anchor when a number of HTML elements in the repeat of the HTML elements satisfies a threshold value; generating a snippet from the respective text content for the respective resource; identifying a document object model (DOM) node of a DOM path of the second resource, where the DOM node is associated with the particular text content and defined by the domain template, and obtaining the respective text content for the respective resource from text content associated with the DOM node; determining that a DOM path of a third resource belonging to the particular domain matches a DOM path defined by the domain template, and based on determining that the DOM path of the third resource belonging to the particular domain matches the DOM path defined by the domain template, obtaining the respective text content for the third resource from text content associated with a DOM node of the DOM path of the third resource; identifying a particular DOM node of a DOM path of the second resource, where the particular DOM node is associated with the particular text content and defined by the domain template; identifying a parent DOM node of the particular DOM node of the DOM path; identifying one or more other DOM nodes that are child DOM nodes of the parent DOM node, and obtaining the respective text content for the second resource from (i) text content associated with the particular DOM node and (ii) text content associated with the one or more other DOM nodes; the particular text content including anchor-text of the anchor; and the particular text content including text content that is proximate to anchor-text of the anchor. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. By systematically promoting text content that is in proximity to the reference text content, the relevance of snippets may be improved. By including text content of other child DOM nodes, additional information related to a search result may be included in the snippet. By traversing through the DOM path that was determined to include useful information for a particular resource, the search system may potentially learn additional information related to the resource.

Each of the advantages above is optional and can be achieved separately or in combination.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2A is an illustration of an example rendering of a first resource for which an HTML pattern may be extracted.

FIG. 2B is an illustration of an example rendering of a second resource for which domain template may be generated.

Like reference numbers and designations in the various drawings indicate like elements.

DETAILED DESCRIPTION

Overview

A process selects multiple pages from a domain as the learning set for text content extraction. For example, the process randomly selects some webpages from a domain as the learning set. For each selected webpage, the process tries to identify some repeated pattern, where the same style of html elements repeats itself over and over again in that webpage. If the identified pattern includes a link to a landing webpage of the same domain and includes a brief text content describing the landing webpage, the process extracts this brief text content.

The process accesses the landing webpage, and determines whether the extracted brief text content is included in the landing webpage. If the brief text content is included in the landing webpage, the process identifies the DOM path that leads to the brief text content, and generates a domain template that specifies the DOM path.

For each respective webpage of the domain, the process determines whether the webpage has similar page structure as the landing webpage. If the webpage has a page structure similar to the domain template, the process generates the summary for the respective webpage using the domain template.

These features and other features are described in more detail in the following sections.

Example Operating Environment

Figure 1:
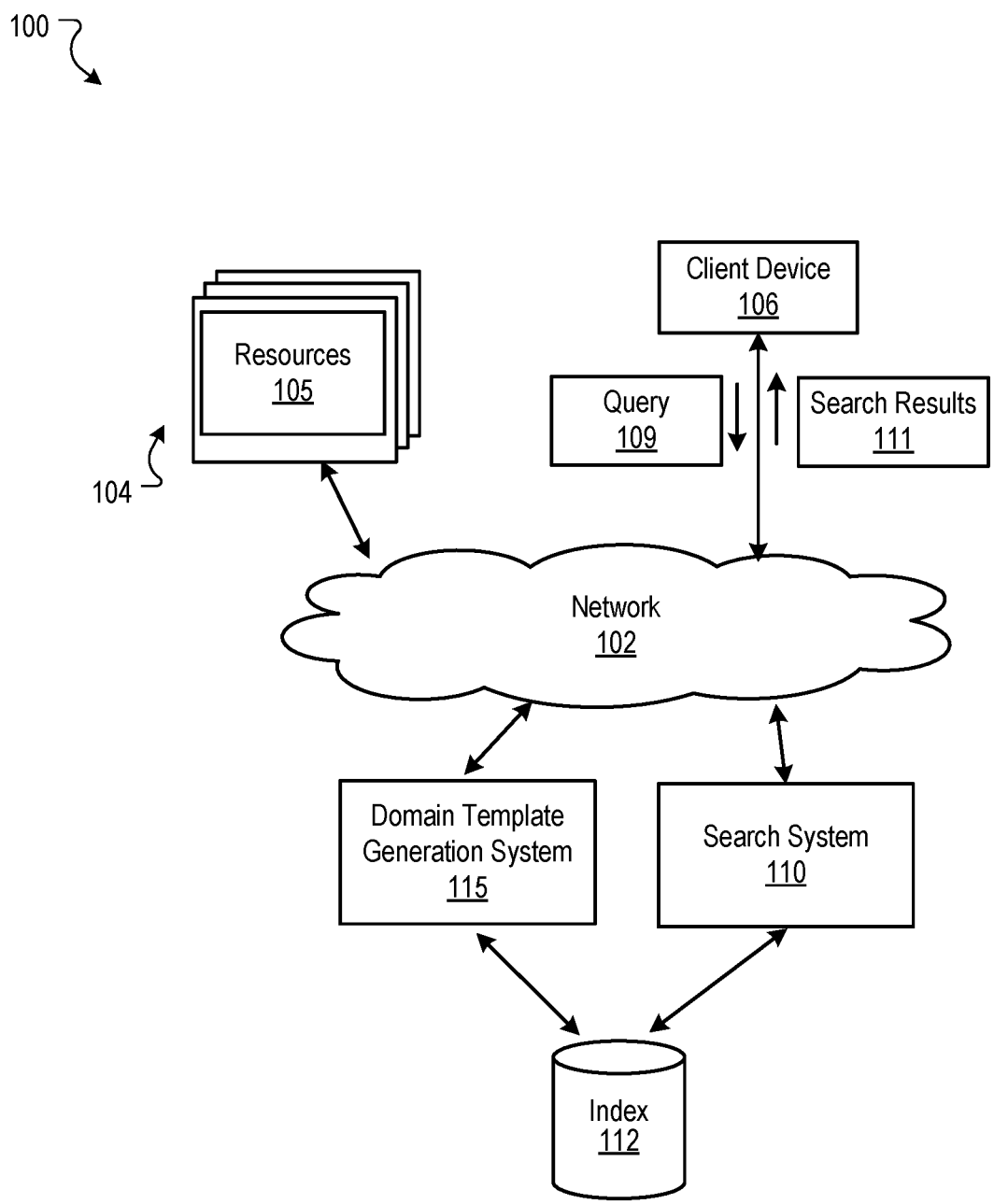
FIG. 1 is a block diagram of a search environment that facilitates resource search operations on a client device.

FIG. 1 is a block diagram of a search environment 100 that facilitates resource search operations on a client device. The example environment 100 includes a network 102, e.g., a local area network (LAN), wide area network (WAN), the Internet, or a combination of them. The network 102 connects Websites 104, client devices 106, the search system 110, and the domain template generation system 115. The environment 100 may include many thousands of publishers of Website 104 and client devices 106.

A Website 104 is one or more resources 105 associated with a domain name and hosted by one or more servers. An example Website is a collection of Webpages formatted in hypertext markup language (HTML) that can contain text, images, multimedia content, and programming elements, e.g., scripts. Each Website 104 is maintained by a publisher, e.g., an entity that manages and/or owns the Website.

A resource 105 is any data that can be provided by a Website 104 over the network 102 and that is associated with a resource address. Resources 105 include HTML pages, word processing documents, and portable document format (PDF) documents, images, video, and feed sources, to name just a few. The resources 105 can include content, e.g., words, phrases, images and sounds and may include embedded information (e.g., meta information and hyperlinks) and/or embedded instructions (e.g., scripts).

A client device 106 is an electronic device that is under control of a user and is capable of requesting and receiving resources 105 over the network 102. Example client devices 106 include personal computers, mobile communication devices, and other devices that can send and receive data over the network 102. A client device 106 typically includes a user application, e.g., a web browser, to facilitate the sending and receiving of data over the network 102.

To facilitate searching of resources 105, the search system 110 identifies the resources 105 by crawling and indexing the resources 105 provided on Websites 104. Data about the resources 105 can be indexed based on the resource to which the data corresponds. The indexed and, optionally, cached copies of the resources 105 are stored in an index 112.

To perform searches, the client devices 106 submit search queries 109 to the search system 110. For instance, any particular search query 109 can include one or more terms consisting of words, numbers or other characters. As an example, the search query 109 entered by the user can be "color of the sky" to search online for information regarding the color of the sky. In response, the search system 110 accesses (e.g., using a search engine) the index 112 to identify resources 105 that are relevant to the search query 109. The search system 110 identifies the resources 105, generates search results 111 that identify the resources 105, and returns the search results 111 to the client devices 106. For example, the search results 111 can include resources 105 corresponding to Web hits related to "color of the sky" in response to the user's search query 109.

A search result 111 is data generated by the search system 110 that identifies a resource 105 that is responsive to a particular search query, and includes a link to the resource 105. An example search result 111 can include a Web page title, a snippet of text extracted from the Web page, and the URL of the Web page.

Generating Domain Template for a Domain and Summaries

In some implementations, the domain template generation system 115 accesses resources 105 belonging to a specific domain, and generates a domain template for generating summaries for the resources 105 belonging to the specific domain. The domain template may be further applied to other resources 105 belonging to the specific domain, where the other resources 105 have a structure that matches the domain template to generate summaries for these resources. In some implementations, the domain template generation system 115 may be a part of the search system 110. In some implementations, the domain template generation system 115 may be a separate system from the search system 110.

Using the domain template, a summary may be generated for each resource belonging to the specific domain that matches the structure of the domain template. These summaries may be used for categorizing the pages, snippet promotion for query relevant snippets that are close to (e.g., either physically or lexically) to the summary, or improving precision for information retrieval, for example.

Figure 2B:
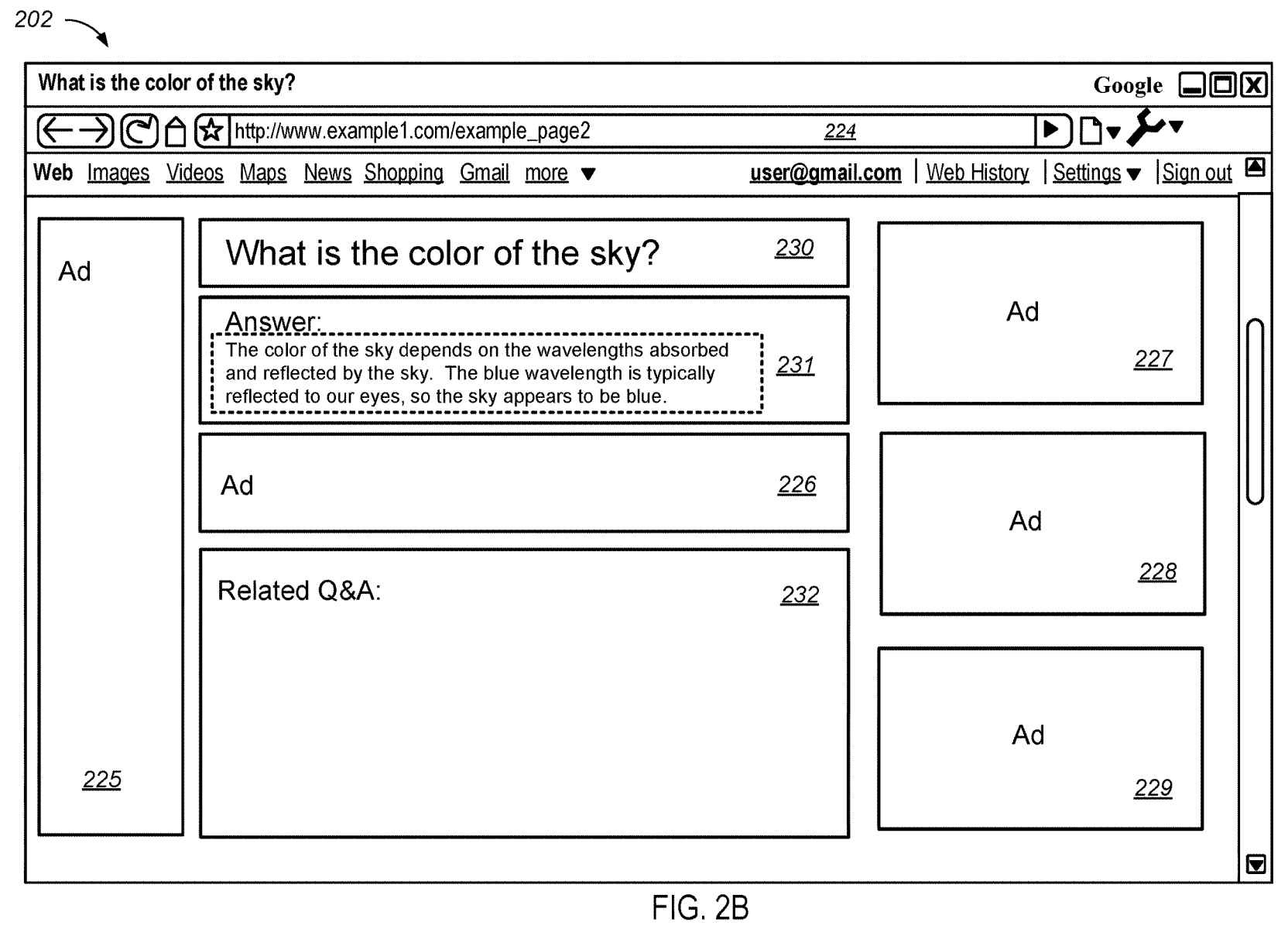
Figure 2C:
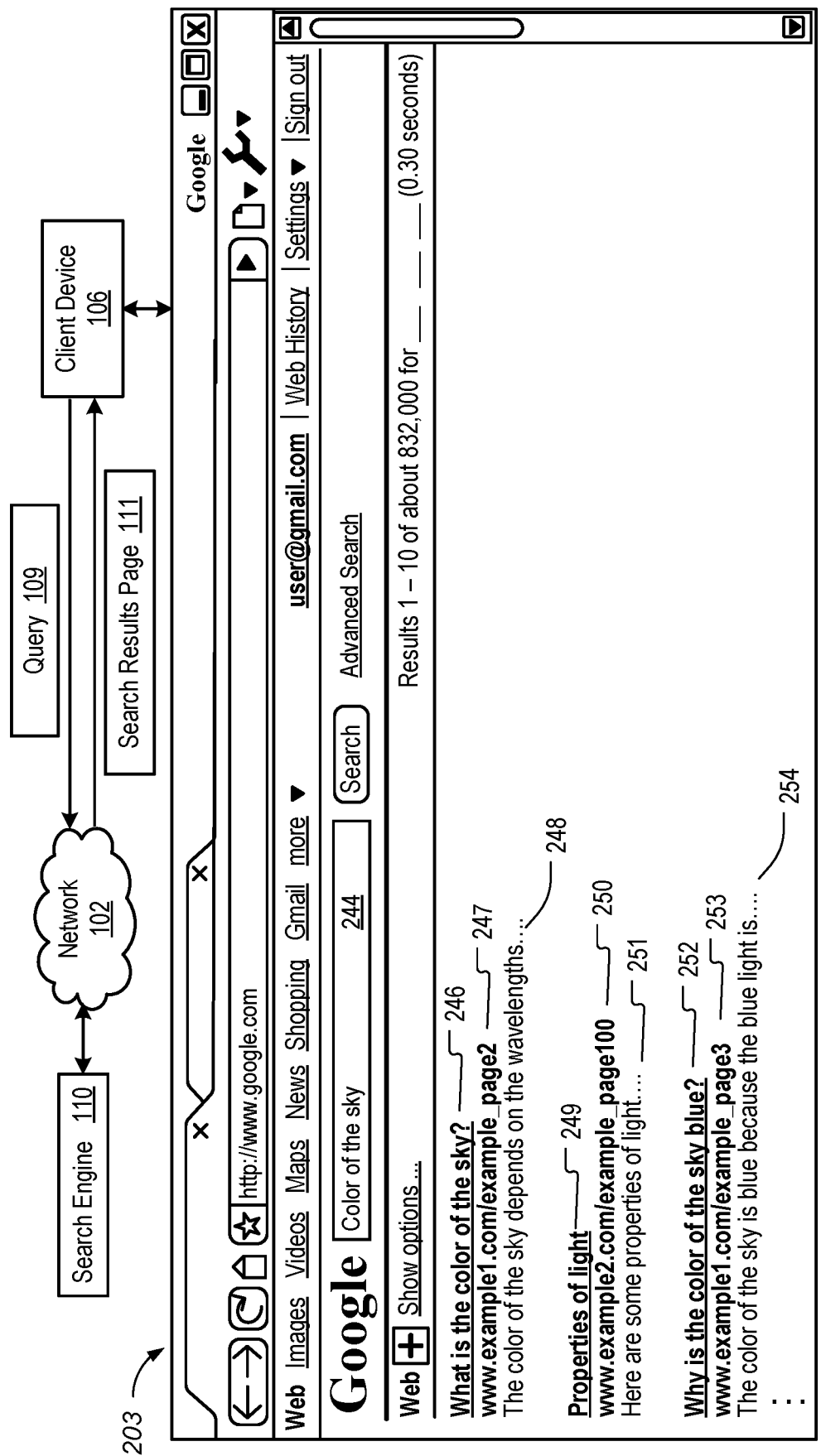
FIG. 2C is an illustration of an example rendering of a search engine user interface for which search results and the respective snippets may be displayed on a client device.

FIGS. 2A-2C illustrates an example of which a domain template may be generated using repeated anchors in a resource. The examples of FIGS. 2A-2C below are described in the context of HTML, but the features can be applied to any mark-up language or any other structured resource rendering scheme.

In particular, FIG. 2A is an illustration of an example rendering of a first resource 201 for which an HTML, pattern may be extracted. The first resource 201 is a Webpage named "example_page1" belonging to a domain "example1.com," and has an URL address 204 of "www.example1.com/example_page1." The rendered layout of the first resource 201 includes advertisement sections 205, 206, 207, 208, and 209, a question section 211, an answer section 231, and a related Q&A section 212.

In some implementations, an advertisement section may include text content, image content, video content, voice content, or any combination thereof. If the advertisement sections 205, 206, 207, 208, and 209 include text content, it may be difficult for the search system 110 to determine which section of the first resource 201 includes relevant text content.

The domain template generation system 115 may access the first resource 201, and determine whether there is a repeated HTML pattern in the first resource 201. A repeated HTML pattern means that the same style of HTML elements repeats itself a threshold number or times or with a threshold frequency on a page. Here, the domain template generation system 115 determines that the Related Q&A section 212 includes a HTML pattern of {anchor text 213, proximate text content 214/anchor text 215, proximate text content 216/anchor text 217, proximate text content 218, . . . }.

As used herein, anchor text is the text associated with, and displayed for, the anchor in a resource. An anchor typically links to a destination resource as specified by an anchor tag of the anchor. Anchor text is the text surrounded by anchor tags, and generally includes natural language describing the destination on the link defined by the anchor tags. For example, an anchor can be represented by the following code:

<a href=URL_of_Destination_Resource>What is the color of the sky?</a>, In the above code, the text "URL_of_Destination_Resource" is the Uniform Resource Locator (URL) for the destination resource, and the text "What is the color of the sky?" is the anchor text for the anchor.

The domain template generation system 115 may determine that the anchors with the anchor text 213, 215, and 217 link to Webpages within the domain "example1.com." The domain template generation system 115 then accesses the landing Webpages linked by the anchor text 213, 215, and 217. Here, the domain template generation system 115 accesses a second resource 202 linked by the anchor 213. Moreover, the domain template generation system 115 extracts the proximate text content 214 "The color of the sky depends on the wavelength."

FIG. 2B is an illustration of an example rendering of a second resource 202 for which domain template may be generated. The second resource 202 is a Webpage named "example_page2" belonging to a domain "example1.com," and has an URL address 224 of "www.example1.com/example_page2." The rendered layout of the second resource 202 includes advertisement sections 225, 226, 227, 228, and 229, a question section 230, an answer section 231, and a related Q&A section 232.

The domain template generation system 115 may determine whether any sections of the second resource 202 includes the proximate text content 214 "The color of the sky depends on the wavelength." Here, the domain template generation system 115 determines that the Answer section 231 includes the proximate text content 214, and identifies the document object model (DOM) path that leads a DOM node that includes the proximate text content 214 in the second resource 202.

In general, web browser applications can use various internal representations of the document, such as a document object model (DOM) representation, for managing and rendering documents to be displayed to the user. The Web browser's rendering module (e.g., part of the Web browser executing on the user's client device 106) can translate a displayed markup language document using some type of translation, such as to a DOM representation.

The DOM representation of a document is in the form a tree of node objects. Each node corresponds to a part of the document. Nodes can be various types including, for example, root nodes, element nodes, attribute nodes, text nodes and script nodes. A text node is a node corresponding to text in the document, and includes text stored in the node. An element node is a node corresponding to an annotation in the document such as <html> tags or <title> tags. An attribute node is a node corresponding to an attribute of an element node, such as the source for an <image> tag. A script node includes an executable script. A DOM representation can also include other types of nodes.

The domain template generation system 115 may generate a domain template for the domain "example1.com" for extracting summaries for Webpages of this domain. The domain template specifies the DOM path of the second resource 202. The domain template generation system 115 may obtain a summary for the second resource 202 using the domain template. The domain template generation system 115 may also crawl through all the other Webpages of this domain to see if any other Webpages fit the structure of the DOM path in the domain template. For those Webpages that fit the structure of the DOM path, the domain template generation system 115 may obtain summaries for those Webpages.

In some implementations, the summaries may be used as search results snippets. FIG. 2C is an illustration of an example rendering of a search engine user interface 203 for which search results and the respective snippets may be displayed on a client device 106. A user of the client device enters a query "Color of the sky" in the text field 244. The client device 106 submits the query 109 to the search engine of search system 110 through the network 102. The search engine returns a search results page 111 that includes a list of the search results. The client device 106 displays the search results page 111 to the user.

The search result 246 links to the Webpage "example_page2" in the domain "example1.com." The corresponding snippet 248 shows the summary obtained using the domain template determined by the domain template generation system 115. Similarly, the search result 252 links to the Webpage "example_page3" in the domain "example1.com." The corresponding snippet 254 shows the summary obtained using the domain template.

The search result 249 links to the Webpage "example_page100" in the domain "example2.com." In some implementations, the snippet 251 of the search result 249 may be obtained using another domain template determined by the domain template generation system 115 for the domain "example2.com." In some other implementations, the snippet 251 of the search result 249 may be obtained without using a domain template.

The summaries for a page need not be used as snippets, however, and instead may be used for other search operations, as described above.

Figure 3:
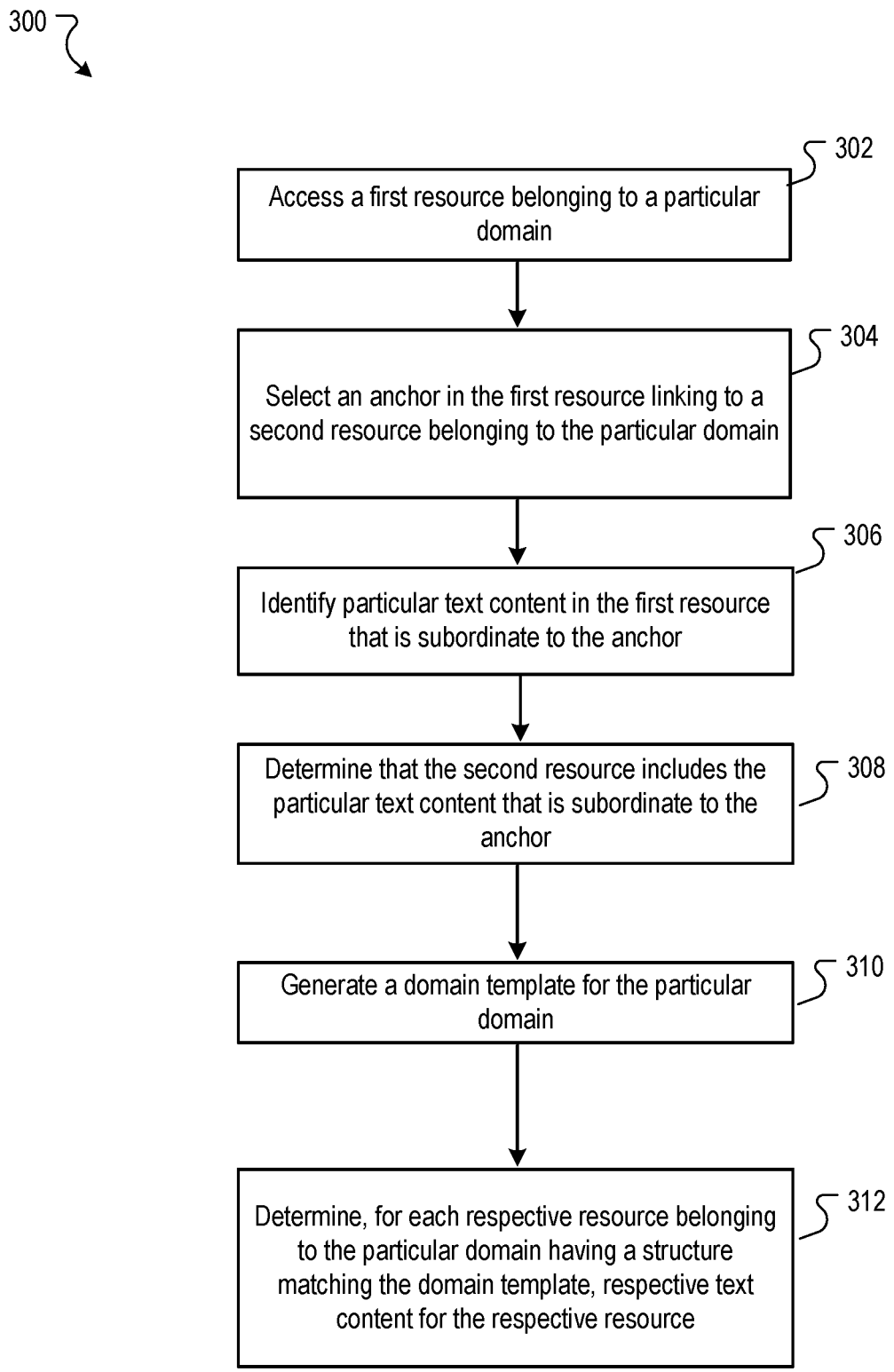
FIG. 3 is a flow diagram of an example process for generating a domain template for a domain.

FIG. 3 shows a flow diagram of an example process 300 for generating a domain template for a domain. In general, the process 300 analyzes selected resources belonging to a domain, and generates a domain template for summary generation. The process 300 will be described as being performed by a computer system comprising one or more computers, for example, the domain template generation system 115 and the example resources 201-203 as shown in FIGS. 2A-2C.

The process 300 accesses a first resource belonging to a particular domain (302). For example, the domain template generation system 115 may randomly accesses multiple resources belonging to the particular domain "example1.com." The accessed resources include the first resource 201.

The process 300 selects an anchor in the first resource linking to a second resource belonging to the particular domain (304). In some implementations, selecting an anchor in the first resource includes identifying a source code pattern that includes a repeat of HTML elements in source code of the first resource. For example, the domain template generation system 115 may parse the source code of the first resource 201, and determine that there is a repeat of anchors in the Related Q&A section 212 of the source code.

In some implementations, each HTML element of the repeat of HTML elements includes a respective anchor that links to a respective resource belonging to the particular domain. For example, the domain template generation system 115 may determine that the anchors 213, 215, and 217 all link to other resources in the domain "example1.com." In response to determining that the anchors 213, 215, and 217 all link to other resources in the domain "example1.com," the domain template generation system 115 may select the anchor 213 as a reference anchor for the domain template. In some implementations, selecting an anchor in the first resource includes selecting the anchor when a number of HTML elements in the repeat of the HTML elements satisfy a threshold value.

The process 300 identifies particular text content in the first resource that is subordinate to the anchor (306). In some implementations, the particular text content includes anchor-text of the anchor. For example, the domain template generation system 115 may identify the anchor text "What is the color of the sky" in the anchor 213 as particular text content that is subordinate to the anchor.

In some other implementations, the particular text content includes text content that is proximate to anchor-text of the anchor. For example, the domain template generation system 115 may identify the text content that is proximate to the anchor 213 as particular text content that is subordinate to the anchor. Here, the text content "The color of the sky depends on the wavelength" is identified as the particular text content that is subordinate to the anchor by the domain template generation system 115.

The process 300 determines that the second resource includes the particular text content that is subordinate to the anchor (308). For example, the domain template generation system 115 may determine that the anchor 213 links to a second resource 202. The domain template generation system 115 may then determine that the second resource 202 includes the particular text content "The color of the sky depends on the wavelength" in its Answer section 231.

The process 300 generates a domain template for the particular domain, the domain template specifying a location of the particular text content in the second resource based on determining that the second resource includes the particular text content that is subordinate to the anchor (310). For example, the domain template generation system 115 may determine that the Answer section 231 includes the particular text content. Then, the domain template generation system 115 may determine the DOM path of the Answer section 231. The domain template generation system 115 may generate a domain template for the domain "example1.com," where the domain template specifies the DOM path of the Answer section.

The process 300 determines, for each respective resource belonging to the particular domain having a structure matching the domain template, respective text content for the respective resource (312). In some implementations, determining respective text content for the respective resource includes identifying a document object model (DOM) node of a DOM path of the second resource, wherein the DOM node is associated with the particular text content and defined by the domain template, and obtaining the respective text content for the respective resource from text content associated with the DOM node. For example, the domain template generation system 115 may parse through each resource belonging to the domain "example1.com," and determines whether a respective resource has a DOM path that corresponds to the DOM path determined for the second resource 202. If so, the domain template generation system 115 may generate a content summary for the respective resource using the content in the Answer section of the respective resource.

To illustrate, another resource different from the resource from which the domain template was extracted may have a structure that matches the template. For example, the domain template generation system 115 may determine that a third resource, "example_page 3" of the domain "example1.com" has a DOM path that matches the DOM path of the Answer section of the second resource 202. In some implementations, based on determining that the DOM path of the third resource belonging to the particular domain matches the DOM path defined by the domain template, the process obtains the respective text content for the third resource from text content associated with a DOM node of the DOM path of the third resource. For example, once the domain template generation system 115 may determine that a third resource has a DOM path that matches the DOM path of the Answer section 231 of the second resource 202, the domain template generation system 115 may use the domain template to obtain, or generate, a summary for the third resource using the content in the Answer section of the third resource.

Generating Domain Template Using Other DOM Nodes

Figure 4A:
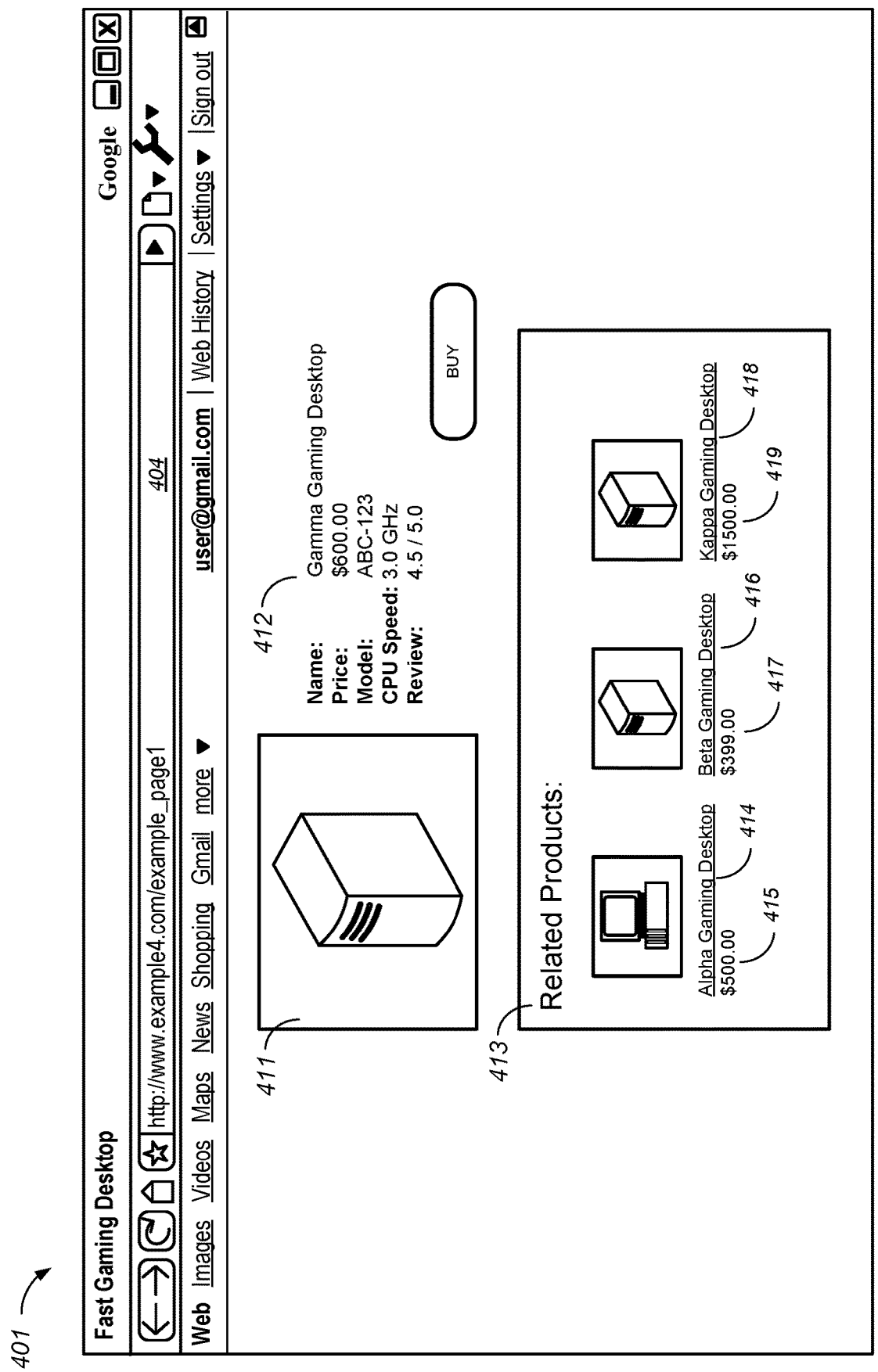
FIG. 4A is an illustration of an example rendering of a first resource for which an HTML pattern may be extracted.
Figure 4B:
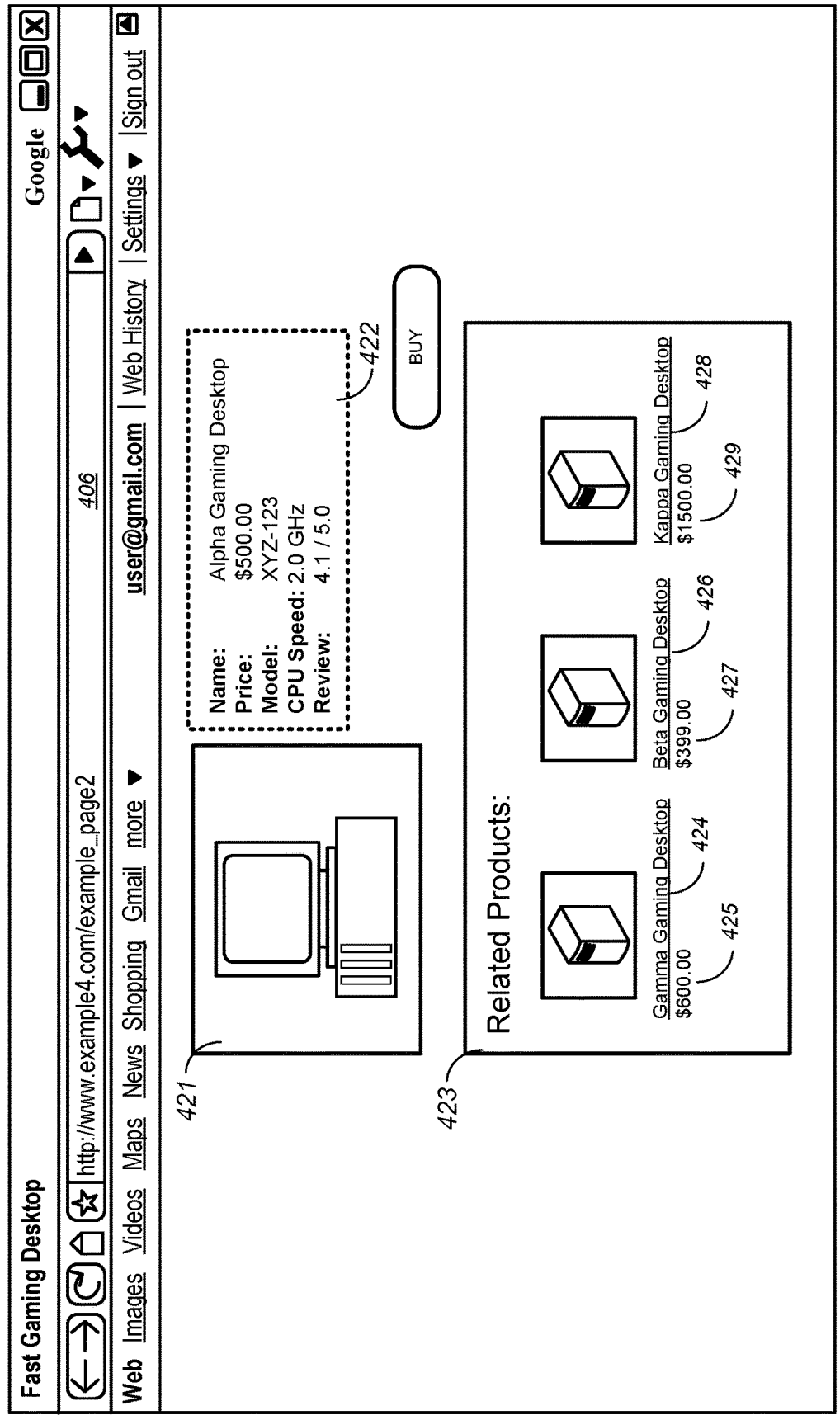
FIG. 4B is an illustration of an example rendering of a second resource for which domain template may be generated using additional DOM nodes.
Figure 4C:
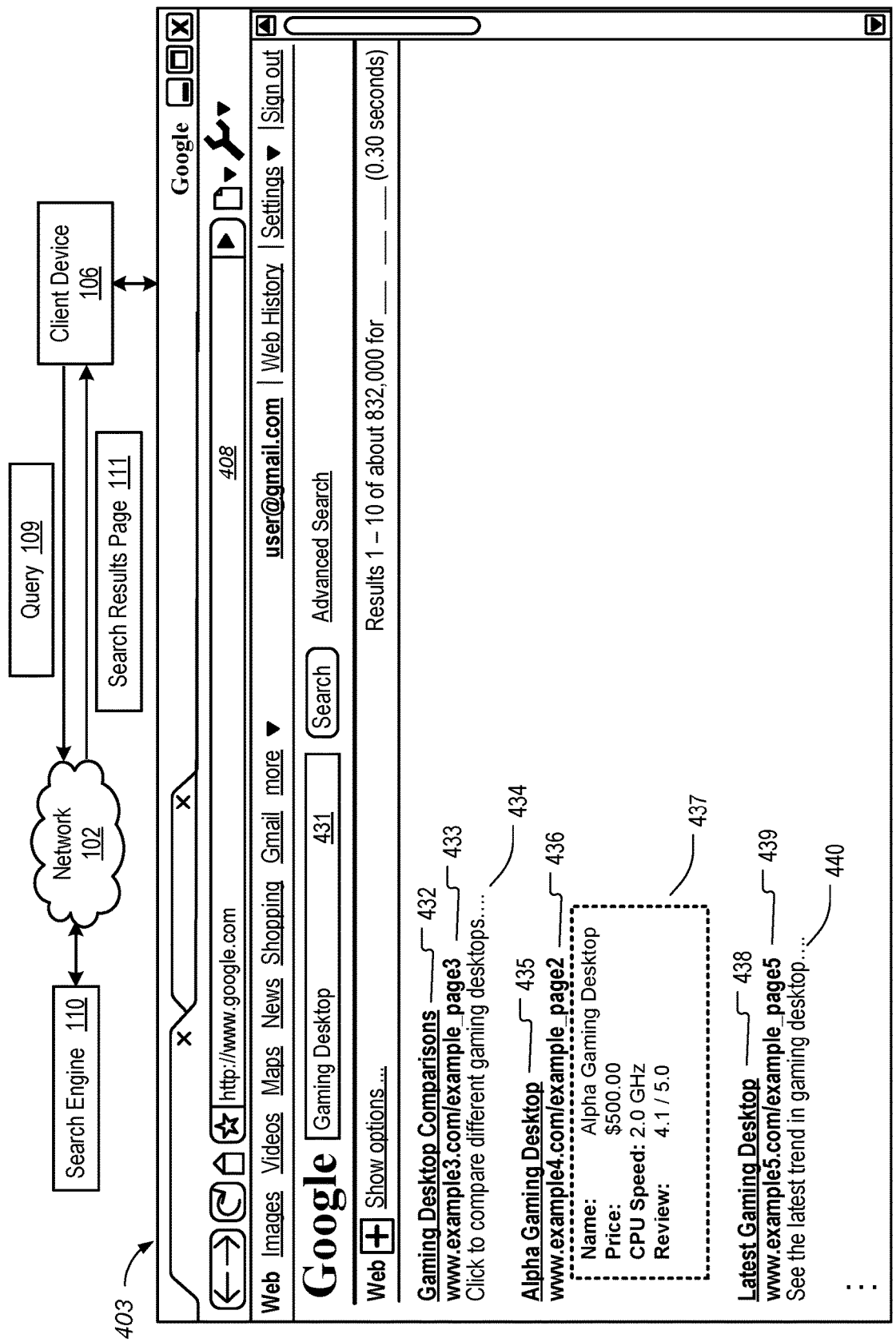
FIG. 4C is an illustration of an example rendering of a search engine user interface for which search results and the respective snippets may be displayed on a client device.

In some situations, the matching text of the first resource may be a subset of text of the second resource, and the second resource may include addition text. For example, the first resource may list a computer price, and the second page may include, in addition to the price, other computer specifications in sibling DOM nodes, i.e., DOM nodes that each descend from a same parent node. For these situations, the system can expand the template to include these additional nodes to form a more complete summary. FIGS. 4A-4C illustrates an example of which such a domain template may be generated using other DOM nodes that are not on the determined DOM path.

FIG. 4A is an illustration of an example rendering of a first resource 401 for which an HTML pattern may be extracted. The first resource 401 is a Webpage named "example_page1" belonging to a domain "example4.com," and has an URL address 404 of "www.example4.com/example_page1." The rendered layout of the first resource 401 includes a product section 411, a description section 412, and a related product section 413.

The product section 411 specifies which product is for sale on the first resource 401. The description section 412 specifies information about the product. Here, the product information may be represented by a DOM structure, where each of the attributes "Name," "Price," "Model," "CPU Speed," and "Review," may be represented as child nodes for a parent node "Product." The related product section 413 specifies other products that are related to the product shown in 411.

The domain template generation system 115 may access the first resource 401, and determine whether there is a HTML pattern in the first resource 401. Here, the domain template generation system 115 determines that the related product section 413 includes a HTML pattern of {anchor text 414, proximate text content 415/anchor text 416, proximate text content 417/anchor text 418, proximate text content 419}.

The domain template generation system 115 may determine that the anchors with the anchor text 414, 416, and 418 link to Webpages within the domain "example4.com." The domain template generation system 115 then accesses the landing Webpages linked by the anchor text 414, 416, and/or 418. Here, the domain template generation system 115 accesses a second resource 402 linked by the anchor 414. Moreover, the domain template generation system 115 extracts the proximate text content 415 "$500.00."

FIG. 4B is an illustration of an example rendering of a second resource 402 for which domain template may be generated using additional DOM nodes. The second resource 402 is a Webpage named "example_page2" belonging to a domain "example4.com," and has an URL address 406 of "www.example4.com/example_page2." The rendered layout of the second resource 402 includes a product section 421, a description section 422, and a related product section 423.

The domain template generation system 115 may determine whether any sections of the second resource 402 includes the proximate text content 415 "$500.00." Here, the domain template generation system 115 determines that the description section 422 includes the proximate text content 415, and identifies the document object model (DOM) path that leads a DOM node that includes the proximate text content 415 in the second resource 402.

In some implementations, the domain template generation system 115 may determine whether a parent DOM node of the DOM node that includes the proximate text content 415 has other child DOM nodes. Here, the parent DOM node "Product" includes children nodes "Name," "Price," "Model," "CPU Speed," and "Review."

The domain template generation system 115 may generate a domain template for the domain "example4.com" for extracting summaries for Webpages of this domain. The domain template specifies the DOM path to the DOM node "Price." The domain template may further specify the DOM paths to the other child DOM nodes. The domain template generation system 115 may obtain a summary for the second resource 402 using the domain template. The domain template generation system 115 may also crawl through all the other Webpages of this domain to see if any other Webpages fit the structure of the DOM path in the domain template. For those Webpages that fit the structure of the domain template, the domain template generation system 115 may obtain summaries for those Webpages.

FIG. 4C is an illustration of an example rendering of a search engine user interface 403 for which search results and the respective summaries may be displayed as snippets may be displayed on a client device 106. A user of the client device enters a query "Gaming Desktop" in the text field 431. The client device 106 submits the query 109 to the search engine of search system 110 through the network 102. The search engine returns a search results page 111 that includes a list of the search results. The client device 106 displays the search results page 111 to the user.

The search result 432 links to the Webpage "example_page3" in the domain "example3.com." In some implementations, the snippet 434 of the search result 432 may be obtained using another domain template determined by the domain template generation system 115 for the domain "example3.com." In some other implementations, the snippet 434 of the search result 432 may be obtained without using a domain template.

The search result 435 links to the Webpage "example_page2" in the domain "example4.com." The corresponding snippet 437 shows the summary obtained using the domain template determined by the domain template generation system 115 for the domain "example4.com." Notably, the snippet 437 includes several attributes of the Alpha Gaming Desktop, which are represented by child DOM nodes in the second resource 402.

Figure 5:
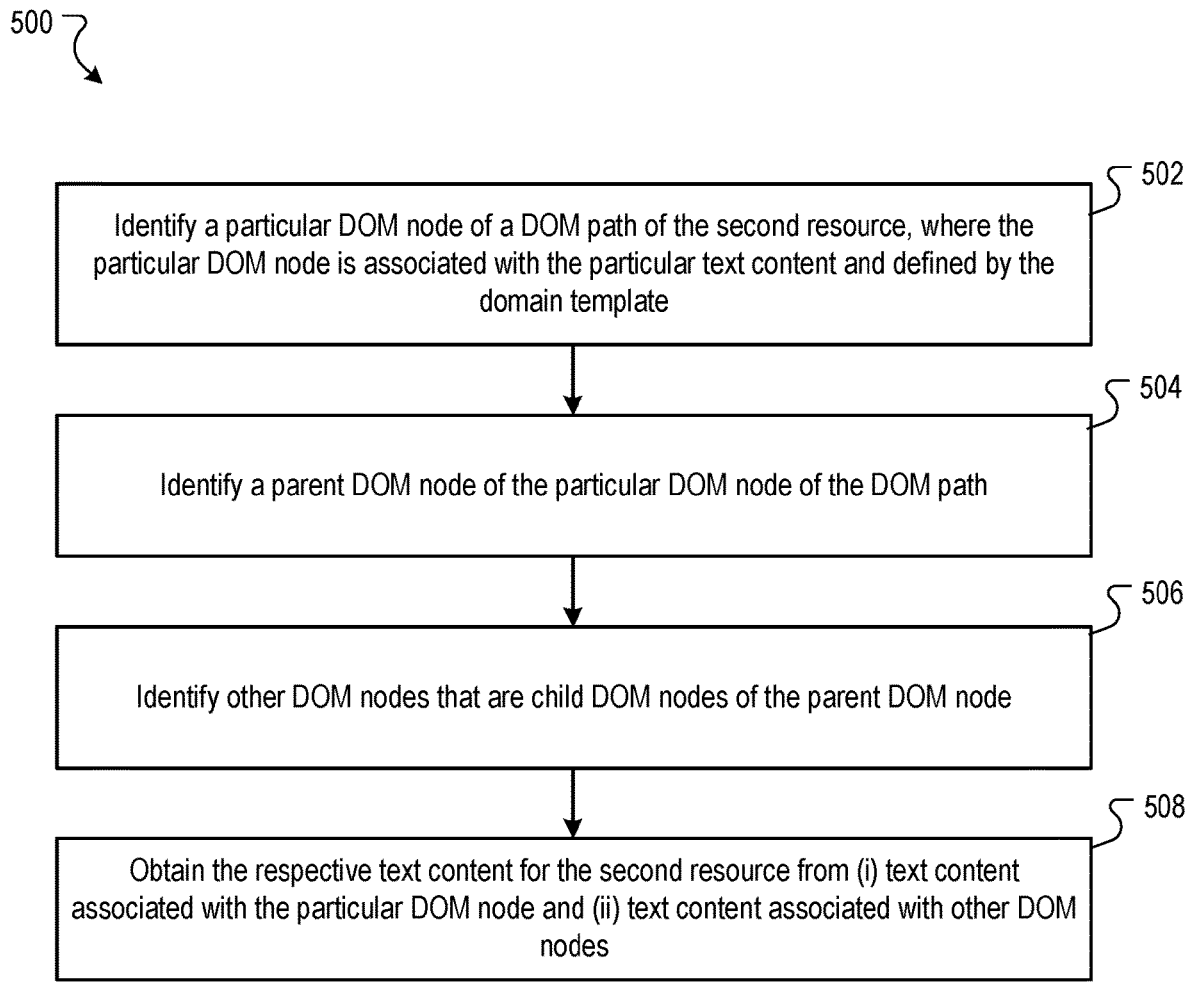
FIG. 5 shows a flow diagram of an example process for generating a domain template for a domain using additional DOM nodes.

FIG. 5 shows a flow diagram of an example process 500 for generating a domain template for a domain using additional DOM nodes. In general, the process 500 analyzes selected resources belonging to a domain, and generates a domain template for summary generation. The process 500 will be described as being performed by a computer system comprising one or more computers, for example, the domain template generation system 115 and the example resources 401-403 as shown in FIGS. 4A-4C.

The process 500 identifies a particular DOM node of a DOM path of the second resource, wherein the particular DOM node is associated with the particular text content and defined by the domain template (502). For example, the domain template generation system 115 may identify that a DOM node, "Price," of the second resource 402 includes the particular text content "$500.00" as specified in the Related Products section of the first resource 401. The domain template generation system 115 may further identify that the DOM path that includes the DOM node "Price" is defined by the domain template for the domain "example2.com."

The process 500 identifies a parent DOM node of the particular DOM node of the DOM path (504). For example, the domain template generation system 115 may identify that the DOM node "Price" is a child node of a parent DOM node "Product" on the DOM path.

The process 500 identifies one or more other DOM nodes that are child DOM nodes of the parent DOM node (506). For example, the domain template generation system 115 may identify that the parent node "Product" may have multiple other child nodes. Here, the child nodes include "Name," "Price," "Model," "CPU Speed," and "Review." Each child node denotes to a specific attribute of the product.

The process 500 obtains the respective text content for the second resource from (i) text content associated with the particular DOM node and (ii) text content associated with the one or more other DOM nodes (508). For example, the domain template generation system 115 may obtain a summary for the second resource 402 by including text content associated with the "Price" node and text content associated with the "Name," "Model," "CPU Speed," and "Review" nodes. In some implementations, the domain template generation system 115 may not include text content associated one or more of the other nodes. For example, the domain template generation system 115 may determine that text content associated with the node "Model" is not helpful to users in general, and may exclude the text content associated with the node "Model" accordingly, as shown in the snippet 437 in FIG. 4C.

Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

As used in this specification, an "engine" (or "software engine") refers to a software implemented input/output system that provides an output that is different from the input. An engine can be an encoded block of functionality, such as a library, a platform, a Software Development Kit ("SDK"), or an object.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    selecting, by one or more computers, an anchor in a first resource linking to a second resource, the first resource and the second resource both belonging to a particular domain;
    identifying, by the one or more computers, particular text content in the first resource that relates to the anchor;
    determining, by the one or more computers, whether the second resource includes the particular text content;
    in response to determining that the second resource includes the particular text content:
        identifying, by the one or more computers in the second resource, a structure element associated with the particular text content,
        determining, by the one or more computers, that a third resource belonging to the particular domain includes respective text associated with the structure element, and
        storing the respective text in association with the third resource;
    determining, by the one or more computers, that the third resource is relevant to a search query; and
    based on determining that the third resource is relevant to the search query, obtaining the respective text stored in association with the third resource and providing, by the one or more computers, a search results page that includes the respective text associated with the third resource.

2. The method of claim 1, further comprising:
    identifying the structure element as a repeated pattern in a plurality of resources in the particular domain; and
    associating the structure element with the particular domain.

3. The method of claim 1, wherein the structure element is a first structure element and the respective text is first text and the method further comprises:
    identifying, in the second resource, a second structure element related to the first structure element;
    determining that the third resource includes second text associated with the second structure element; and
    storing the second text and the first text in association with the third resource,
    wherein the search results page includes the second text and the first text for the third resource.

4. The method of claim 1, wherein the structure element is a document object mode path.

5. The method of claim 1, wherein the particular text content is distinct from anchor-text of the anchor.

6. The method of claim 1, further comprising classifying the third resource based on the respective text.

7. The method of claim 1, wherein the particular text content is subordinate to the anchor.

8. A method comprising:
    selecting, by one or more computers, an anchor in a first resource linking to a second resource, the first resource and the second resource belonging to a particular domain;
    identifying, by the one or more computers, particular text content in the first resource that relates to the anchor;
    determining, by the one or more computers, whether the second resource includes the particular text content;
    in response to determining that the second resource includes the particular text content:
        generating, by the one or more computers, a domain template for the particular domain, the domain template specifying a structure element associated with the particular text content, and
        associating, by the one or more computers, the domain template with the particular domain;
    determining, by the one or more computers, that a third resource belongs to the particular domain, is responsive to a search query, and includes a structure element matching the structure element specified in the domain template; and
    based on determining that the third resource is relevant to the search query and includes the structure element, obtaining, from the third resource, respective text that is associated with the structure element and providing, by the one or more computers, a search results page that includes respective text from the third resource that is associated with the structure element.

9. The method of claim 8, wherein determining that the third resource includes the structure element matching the domain template includes:
determining that a DOM path of the third resource matches a DOM path defined by the domain template, wherein the respective text is associated with a DOM node of the DOM path.

10. The method of claim 8, wherein the structure element is a first structure element and generating the domain template further comprises:
identifying, in the second resource, a second structure element related to the first structure element; and
including the second structure element in the domain template,
wherein the search results page further includes, for the third resource, text from the third resource associated with the second structure element.

11. The method of claim 10, wherein identifying the second structure element related to the first structure element includes:
determining, for the second resource, a DOM path that includes the first structure element; and
determining that the second structure element is a sibling of the first structure element in the DOM path.

12. The method of claim 8, wherein the particular text content is distinct from anchor-text of the anchor.

13. The method of claim 8, wherein selecting the anchor in the first resource includes:
identifying a repeated markup pattern, the anchor being associated with an instance of the repeated markup pattern.

14. The method of claim 13, wherein selecting the anchor in the first resource further includes:
determining that the repeated markup pattern occurs a threshold number of times prior to selecting the anchor.

15. The method of claim 8, wherein the particular text content is proximate and after the anchor.

16. A method comprising:
identifying, by one or more computers, in a first resource belonging to a domain, an anchor linking to a second resource belonging to the domain, the anchor being an instance of a repeated markup pattern in the first resource;
identifying, by the one or more computers, particular text content in the first resource located near the anchor;
verifying, by the one or more computers, whether the second resource includes the particular text content;
in response to verifying that the second resource includes the particular text content, generating, by the one or more computers, a summary for the second resource that includes the particular text content;
determining, by the one or more computers, that the second resource is responsive to a search query; and
based on determining that the second resource is relevant to the search query, obtaining the generated summary and providing, by the one or more computers, a search results page that includes the generated summary.

17. The method of claim 16, wherein the particular text content is distinct from anchor-text of the anchor.

18. The method of claim 16, wherein identifying the anchor includes determining that the repeated markup pattern repeats a threshold number of times in the first resource.

19. The method of claim 16, further comprising classifying the second resource based on the generated summary.

* * * * *